(12) United States Patent
Fish

(10) Patent No.: US 8,317,396 B2
(45) Date of Patent: *Nov. 27, 2012

(54) HYBRID BEARING CYLINDER

(75) Inventor: Elson B. Fish, Lakeville, IN (US)

(73) Assignee: Polygon Company, Walkerton, IN (US)

( * ) Notice: Subject to any disclaimer, the term of this patent is extended or adjusted under 35 U.S.C. 154(b) by 434 days.

This patent is subject to a terminal disclaimer.

(21) Appl. No.: 12/557,048

(22) Filed: Sep. 10, 2009

(65) Prior Publication Data

US 2010/0031815 A1     Feb. 11, 2010

Related U.S. Application Data

(63) Continuation-in-part of application No. 11/868,363, filed on Oct. 5, 2007, now Pat. No. 7,980,762, which is a continuation-in-part of application No. 11/566,535, filed on Dec. 4, 2006, now Pat. No. 7,278,788, which is a continuation of application No. 10/165,237, filed on Jun. 7, 2002, now abandoned.

(51) Int. Cl.
     *F16C 19/02*     (2006.01)

(52) U.S. Cl. ............................................ 384/42; 384/29
(58) Field of Classification Search .................. 384/26, 384/29, 42, 298; 156/174; 92/170.1
See application file for complete search history.

(56) References Cited

U.S. PATENT DOCUMENTS

| 5,131,818 | A  | * | 7/1992  | Wittkop et al. ............. 92/170.1 |
| 7,278,788 | B2 | * | 10/2007 | Fish et al. .................. 384/42 |
| 7,980,762 | B2 | * | 7/2011  | Fish et al. .................. 384/42 |

* cited by examiner

*Primary Examiner* — Thomas R Hannon
(74) *Attorney, Agent, or Firm* — Barnes & Thornburg LLP; Mark J. Nahnsen

(57) ABSTRACT

A hybrid bearing cylinder is formed to include a composite sleeve and a metallic jacket positioned around the composite sleeve. The outer diameter of the composite sleeve is less the inner diameter of the metallic jacket to form a pre-designed gap between the composite sleeve and the metallic jacket The metallic jacket of the hybrid bearing cylinder is adapted to be secured to metallic cylinder end caps by threading, welding, swaging, or other metal attachment methods.

18 Claims, 5 Drawing Sheets

HYBRID BEARING CYLINDER

CROSS REFERENCE TO RELATED APPLICATIONS

This application is a continuation-in-part application of co-pending U.S. application Ser. No. 11/868,363, filed Oct. 5, 2007, which is a continuation-in-part application of U.S. application Ser. No. 11/566,535, filed Dec. 4, 2006, which is a Continuation of U.S. application Ser. No. 10/165,237, filed Jun. 7, 2002, which are expressly incorporated by reference herein in their entirety.

BACKGROUND

The present disclosure relates to bearing members, and, in particular, to cylinders having an inner bearing surface, and relates to a method of making such a cylinder.

SUMMARY

According to the present disclosure, a bearing cylinder is formed to include a tubular structure having an inner bearing surface, an outer surface and first and second ends. The bearing cylinder is adapted to accept a piston so that the cylinder can be used for pneumatic and hydraulic applications.

In illustrative embodiments, the bearing cylinder includes a composite sleeve that is made from a composite material that is formed from a resin matrix and includes an inner bearing surface. The composite sleeve includes a filament material that is helically embedded in the resin matrix. The resin matrix is composed of a resin material having fumed silica therein. A layer of the resin material is located at the inner bearing surface.

In illustrative embodiments, the composite bearing cylinder is positioned within a metallic jacket. The metallic jacket surrounds the bearing cylinder and is separated from the composite bearing cylinder by a pre-designed gap between the composite bearing cylinder and the metallic jacket. The resultant hybrid bearing cylinder can be secured to metallic cylinder end caps by use of threading, welding, swaging or other metal attachment methods. The resultant hybrid bearing cylinder allows for use with higher pressures and can be used with standard mill stock tubes.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The present invention and the advantages thereof will become more apparent upon consideration of the following detailed description when taken in conjunction with the accompanying drawings of which.

DETAILED DESCRIPTION

Figure 1:
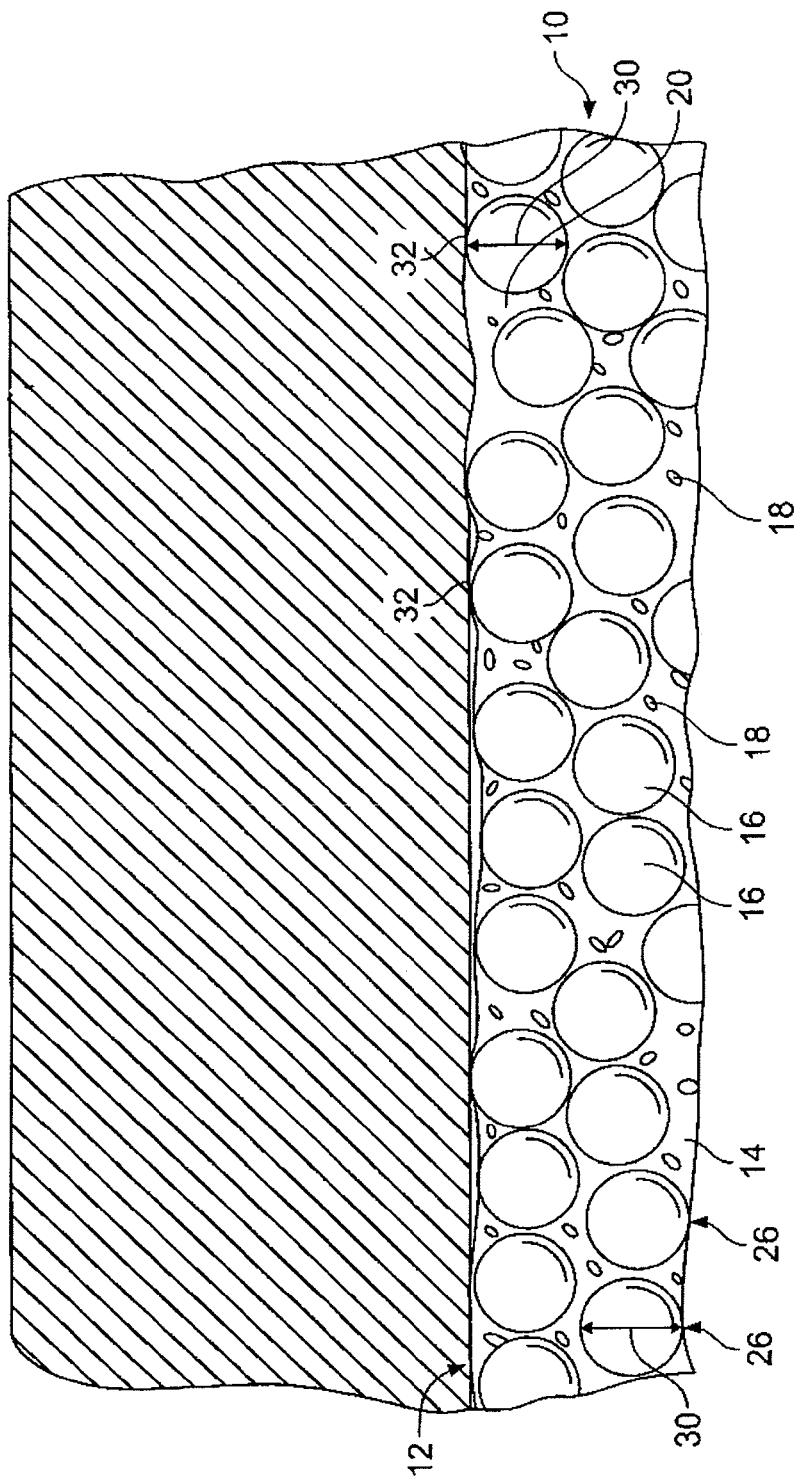
FIG. 1 is a partial, cross-sectional view of the hybrid bearing cylinder of the present invention.

Referring now to the drawings, and more particularly to FIG. 1, there is shown a composite sleeve 10 having an inner surface 12. Composite sleeve 10 includes a resin matrix 14 with a continuous filament material 16 and, optionally, a plurality of particulate additives 18 embedded therein. Hybrid cylinder is designed for higher pressures such as 3000 psig as used by the fluid power industry.

Resin matrix 14 is composed of a resin material having fumed silica (commonly sold under the trade name "Cab-O-Sil") therein. Advantageously, 2% to 10% (by weight) thereof is employed with about 8% fumed silica being preferred. While fumed silica is used it is contemplated that any material having similar thixotropic properties and tribological characteristics such as wear resistance and hardness could be used in place of fumed silica. An inner layer 20 of resin matrix 14 exists at inner surface 12, thereby greatly, due to the hardness imparted thereto by the fumed silica present therein. The resin material may be made to be either translucent or colored, as desired.

Continuous filament material 16 is helically embedded within resin matrix 14 to thereby add to the toughness (i.e., durability) of composite sleeve 10.

Advantageously, filament windings 26 each have a round filament cross-section 30, thereby forming a series of rounded filament surfaces 32 at or near inner surface 12. Inner layer 20 of resin matrix 14 and the series of rounded filament surfaces 32 at or near inner surface 12 define the totality of inner surface 12. The combination of the fumed silica in resin matrix 14 and rounded filament surfaces 32 permits the surface finish of inner surface 12 to be an arithmetic average roughness (Ra) of about 25 .mu.in or greater, whereas normal metallic cylinders require Ra of less than 16 μm due to the abrasive (interlocking friction) characteristic resulting from a machined surface.

Advantageously, continuous filament material 16 is a fiberglass material. Fiberglass offers advantages of good hardness, generally good durability, a round cross-section and translucency. Some possible choices for particulate additives 18 are polytetrafluoroethylene (PTFE), glass spheres, fine ground silica, etc. or a combination thereof. PTFE, commonly sold under the trade mark "Teflon". Glass spheres offer a rounded surface and good hardness. Fine ground silica helps increase hardness.

Figure 3:
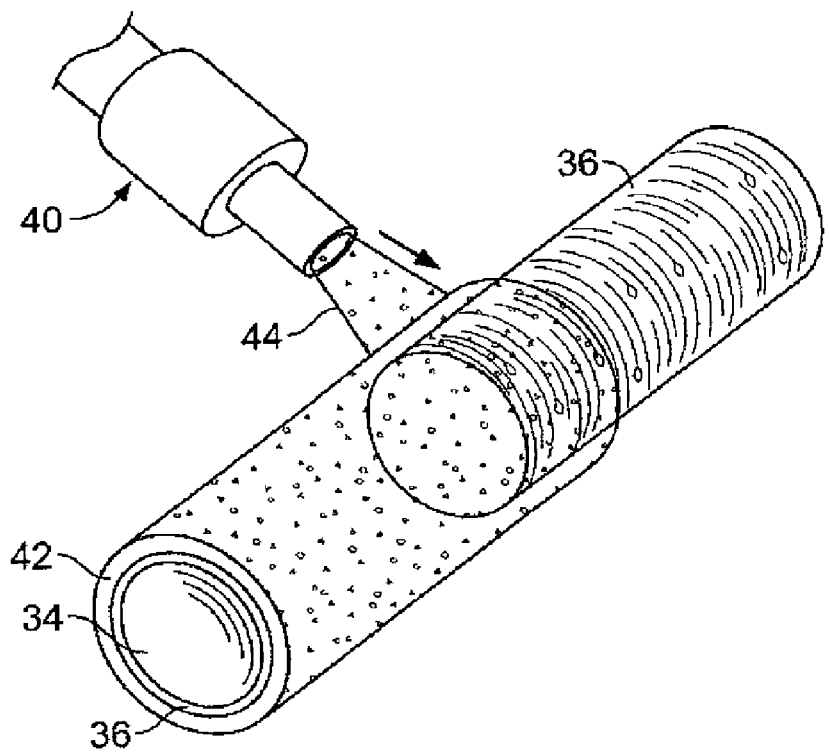
Figure 4:
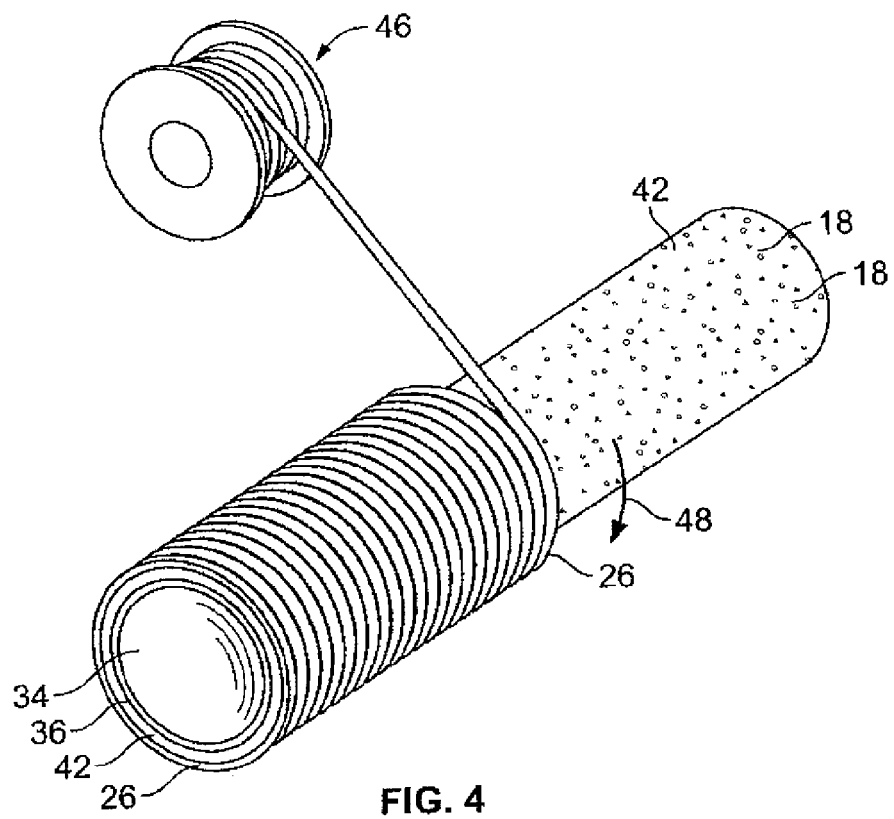
Figure 5:
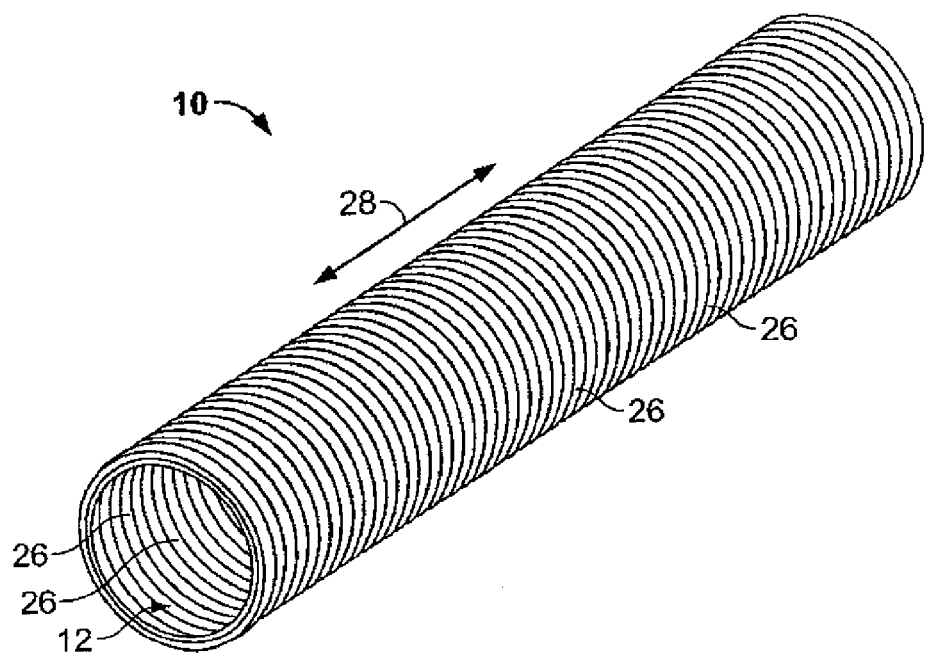
FIG. 5 is a perspective view of a completed hybrid bearing cylinder produced by employing the steps illustrated in FIGS. 2-4.
Figure 6:
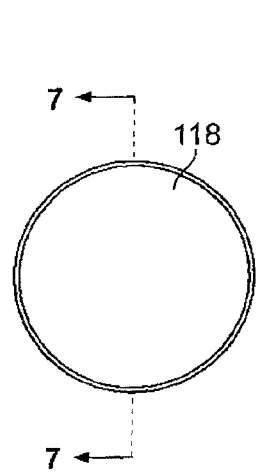
FIG. 6 is an end view of a hybrid bearing cylinder.

FIGS. 2-5 together illustrate various steps in the production of composite sleeve 10, including a perspective view of the finished product (FIG. 5). As set forth in FIG. 2, a highly polished mandrel 34 is provided to act as a mold for inner surface 12. Mandrel 34 advantageously has an arithmetic average roughness (Ra) of no more than about 10 .mu.in. To help achieve the desired level of roughness and promote easy release thereof from the finished product, mandrel 34 is chrome plated.

The bore surface finish of the composite cylinder 10 is primarily a reflection of the mandrel surface finish. The normal bore surface finish of the composite cylinder 10 ranges from 10 Ra to 25 Ra microinches. The surface finish can even be higher and can simulate a microscopic "orange peel" surface profile resulting in less adhesion friction without adversely affecting the seal life as would be the case with bores of metallic cylinders.

Figure 2:
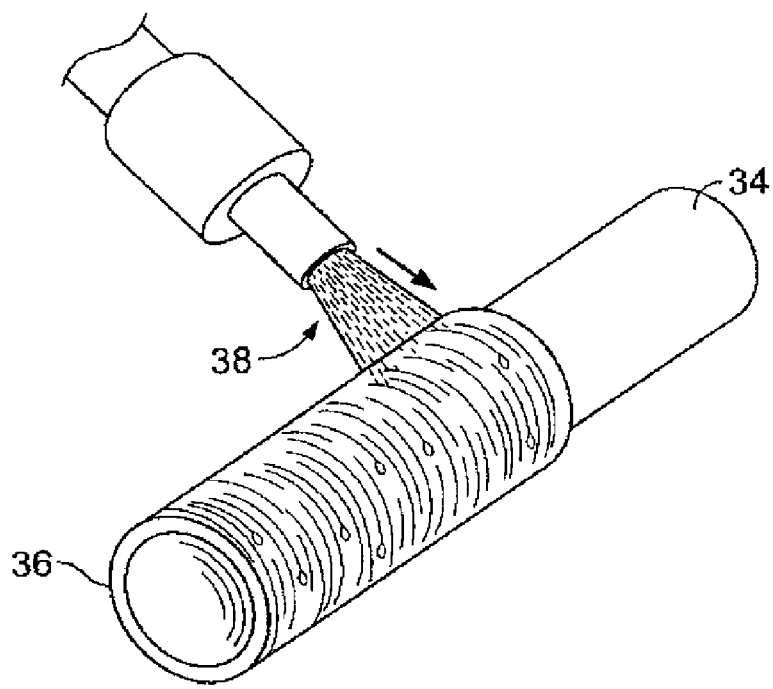
FIGS. 2-4 illustrate a series of steps used in producing the hybrid bearing cylinder of the present invention.

To further aid in the release thereof from the finished product, mandrel 34, as shown in FIG. 2, is desirably initially coated with a release agent 36 supplied by a release agent applicator 38 (shown schematically). Additives can be provided within release agent 36 that will adhere to inner surface 12. PTFE can, for example, be used as such an additive. The coefficient of friction can further be reduced by the migration (transfer) of the mandrel release material from the mandrel to the composite bore surface. Above normal amounts of low friction additives in the mandrel release material such as PTFE particulates can further reduce the friction at the bore surface by the migration process.

In FIG. 3, a resin source 40 of an appropriate resin material 42 and an associated resin applicator 44 are provided. Resin applicator 44 is designed to apply a controlled, even thickness of resin material 42 on mandrel 34. Resin material 42 is applied, desirably in a form of a paste, upon mandrel 34.

As illustrated in FIG. 4, a filament source 46 of continuous filament material 16 is supplied and via which filament windings 26 that are formed substantially transversely of primary direction 28. (Mandrel 34 could be rotatably driven, as schematically shown via arrow 48, to promote the winding of continuous filament material 16 thereon.) Filament windings 26 displace and otherwise become embedded in resin material 42 during this step before resin material 42 has an opportunity to cure.

Once resin material 42 cures, mandrel 34 is then removed from composite sleeve 10 to reveal the finished product shown in FIG. 5.

Figure 7:
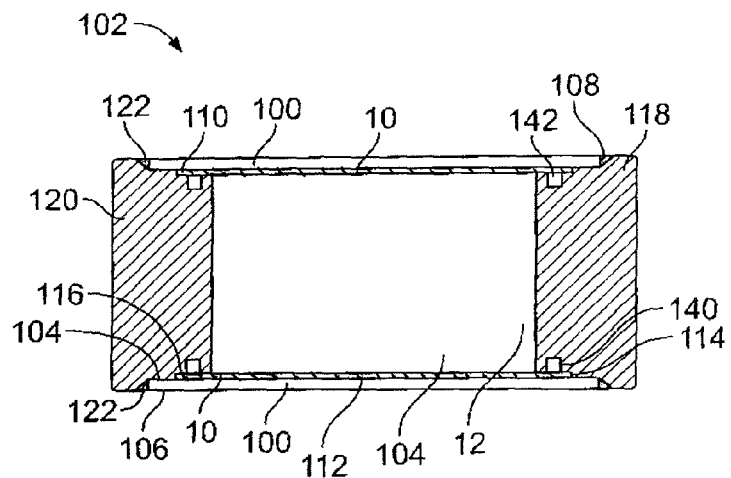
FIG. 7 is a cross section of the hybrid bearing cylinder taken along line 7-7 of FIG. 6 showing the composite bearing cylinder positioned within the metallic jacket and also showing the metallic jacket being secured to a pair of end caps by welding.
Figure 8:
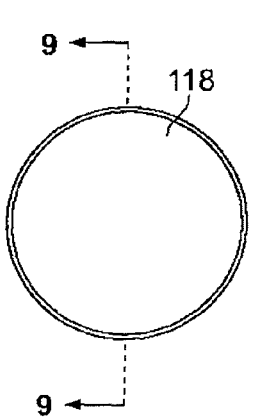
FIG. 8 is an end view of a hybrid bearing cylinder.

Composite sleeve 10 can be used in combination with a metallic jacket 100 to form hybrid bearing cylinder 102, as shown, for example, in FIG. 7. Metallic jacket 100 includes an inner surface 104, an outer surface 106 and first and second ends 108, 110. Composite sleeve 10 includes inner bearing surface 12 and machined outer surface 112. Outer surface 112 of composite sleeve 10 can be machined using a lathing process so that the outer diameter of composite sleeve 10 is less than the inner diameter of metallic jacket 100 to form a pre-designed gap between composite sleeve 10 and metallic jacket 100. This arrangement allows metallic jacket 100 to be positioned around composite sleeve 10 to form hybrid bearing cylinder 102.

The outside diameter of the composite sleeve 10 can be machined to provide for the desired gap between the bore of the outer metallic jacket 100 and the outer diameter of the inner composite sleeve 10. In this embodiment, composite sleeve 10 is not bonded or connected to the outer metallic jacket 100. The position of composite sleeve 10 is retained by end caps 118, 120.

Composite sleeve 10 includes first and second ends 114, 116, as shown, for example, in FIG. 7. The overall length of composite sleeve 10 is shorter than metallic jacket 100 such that first and second ends 114, 116 of composite sleeve 10 are set in from first and second ends 108, 110 of metallic jacket 100. This arrangement allows metallic jacket 100 to be either be secured to end caps 118, 120 by use of welds 122, as shown in FIG. 7 or by threads 124, as shown in FIG. 9 for example.

Use of composite sleeve 10 in combination with metallic jacket 100 provides tribological characteristics such as lower seal wear and friction from the composite sleeve 10 and conventional end retention and attachment capabilities along with external damage resistance features with the metallic jacket 100. Metallic jacket 100 can be made from steel, aluminum or stainless steel. Hybrid bearing cylinder 102 reduces the cost of surface preparation of the metallic cylinders used for fluid power, pneumatic and hydraulic cylinder applications because inner bearing surface 12 is already smooth due to the manufacturing process of the composite sleeve 10.

Use of composite sleeve 10 in combination with metallic jacket 100 provides corrosion resistance to the bore surface allowing other non-compressible fluids, such as water, to be used other than conventional hydraulic fluids, in the cylinder. The hybrid bearing cylinder 102 incorporates the strength and stiffness of metal cylinders and incorporates the bearing surface benefits of the composite sleeve material 10. Use of hybrid bearing cylinder 102 reduces the overall geometric size of the cylinder as compared with an all composite cylinder.

Figure 9:
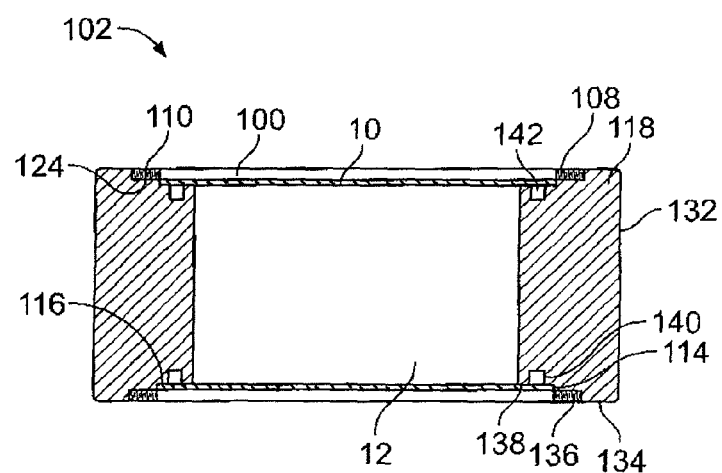
FIG. 9 is a cross section of the hybrid bearing cylinder taken along line 9-9 of FIG. 8 showing the composite bearing cylinder positioned within the metallic jacket and also showing the metallic jacket being secured to a pair of end caps by threads positioned at the ends of the metallic jacket.

End caps 118, 120 are designed to be secured to hybrid bearing cylinder 102 to provide an end seal, as shown, for example, in FIGS. 7 and 9. Depending upon the application, end caps 118, 120 may or may not include a central aperture 126 to permit the passage of a rod 128 used in combination with a piston 130, as shown, for example, in FIG. 12. In the provided examples of the disclosure, end caps 118, 120 include an end wall 132 and an annular side wall 134.

Annular side wall 134 of end caps 118, 120 includes a first annular recess 136 positioned to lie near first and second ends 108, 110 of metallic jacket 100, as shown, for example, in FIG. 7. Metallic jacket 100 can either be welded to side wall 134 of end caps 118, 120 or first annular recess 136 can include threads 124 that engage corresponding threads formed on the inner surface 104 of metallic jacket 100, as shown, for example, in FIG. 9.

End caps 118, 120 also include a second annular recess 138 that is positioned to lie near first and second ends 114, 116 of composite sleeve 10, as shown, for example, in FIG. 7. Second annular recess 138 includes an annular groove 140 that is adapted to accept an o-ring seal 142 to seal against the inner bearing surface 12 of composite sleeve 10.

Figure 10:
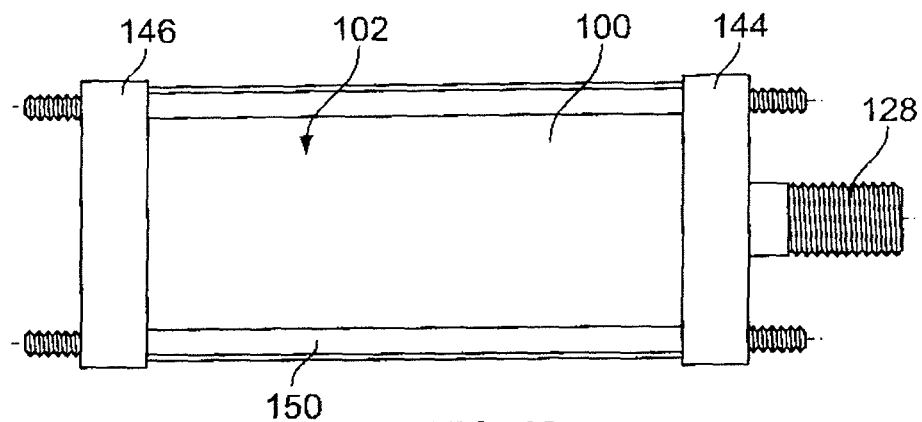
FIG. 10 is a side elevational view of a hybrid bearing cylinder secured to a pair of end caps by a series of threaded rods that extend from end cap to end cap.
Figure 11:
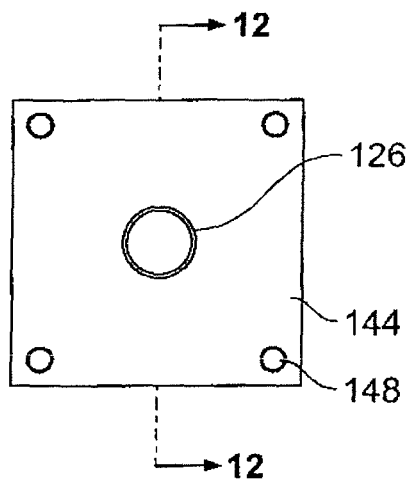
FIG. 11 is an end view of the hybrid bearing cylinder of FIG. 10.
Figure 12:
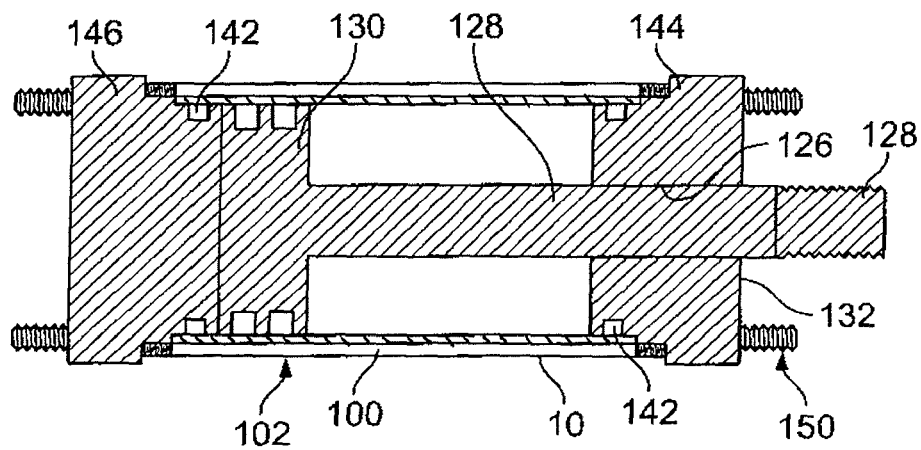
FIG. 12 is a cross section of the hybrid bearing cylinder taken along line 12-12 of FIG. 11 showing the composite bearing cylinder positioned within the metallic jacket and also showing the metallic jacket being secured to a pair of end caps by elongated threaded rods that extend from end cap to end cap.

End caps 144, 146 of hybrid bearing cylinder 102 of FIGS. 10-12 include a series of apertures 148 adapted to accept tie rods 150 that extend from end cap 144 to end cap 146 to compress end caps 144, 146 against hybrid bearing cylinder 102. Use of tie rods 150 replaces the use of welds or threads to secure end caps 144, 146 to hybrid bearing cylinder 102. Use of welds or threads eliminate the need to use tie rods. Swaging, while not illustrated in the figures, can also be used to secure end caps 118, 120 to hybrid bearing cylinder 102.

Metallic jacket 100 can be assembled with composite sleeve 10 by placing composite sleeve 10 within a standard mill stock tube such as DOM steel tubing or extruded aluminum tubing. Steel or aluminum tubing can be used in "as received condition" without the need for expensive machining operations such as boring and polishing the inner surface. Composite cylinder 10 is light weight and corrosion resistant, which makes it possible to use other (potentially corrosive) fluids such as water instead of petroleum based hydraulic fluids.

The clearance between the composite cylinder 10 and the metallic jacket 100 allows the composite cylinder 10 to expand (breath) during normal operating pressures up to about 3000 psig. The present disclosure takes advantage of the elastic and hoop strength properties of the composite cylinder 10. As the pressures exceed the normal operating pressures, the composite cylinder 10 will expand and the outer surface will contact the inner surface of the metallic jacket 100.

The gap is determined by first analyzing the elastic properties of the composite sleeve by use of analytical tools, which incorporates micromechanics and macromechanical equations for laminated composite materials. The gap is normally based on the amount the sleeve will expand due to elastic diametral strain of the composite sleeve and make contact with the outer jacket at operating pressure.

The gap between the composite cylinder 10 and the metallic jacket 100 means that the that the metallic jacket 100 does not require tight tolerances or special surfaces other than provided normally by off-the-shelf metallic tubing such as DOM tubing. The precision bore characteristic of the composite sleeve eliminates the need for costly precision machining and finishing of the outer metallic jacket.

The composite cylinder 10 structurally carries the hoop stress developed by the internal pressure up to the operating pressure or when contact is made with the outer metallic jacket 100. Since the end caps are attached to the outer metallic jacket 100, the outer metallic jacket 100 only carries the axial stress developed by the internal pressure. By observing the meridian and circumferential stresses in the wall of a pressure vessel the meridian stress is half the circumferential stress. Therefore the wall thickness of the jacket only needs to be one half the thickness as normally required. The present arrangement forms significant weight savings since the density of the composite cylinder 10 is one quarter that of steel with equivalent or greater hoop strength and the steel jacket wall thickness is one half the normal steel cylinder required thickness.

After contact, and as pressures continue to increase, the radial strain and stress will be proportionately shared in relationship to the stiffness properties of the composite cylinder 10 and metallic jacket 100. Since the modulus of elasticity of metallic materials is normally substantially greater than the composite material, the rate of strain will decrease as the pressure increases.

Metallic jacket 100 is configured to carry the axial stresses developed by the end forces to provide a non-tie rod cylinder. By locating the material with the highest stiffness properties at the outer surface column buckling resistance is maximized. Material with the greatest modulus of elasticity is most efficiently used by locating the material at the outer surface to maximize column buckling resistance. The Metallic jacket 100 allows for the attachment of end components by welding or threading.

The metallic jacket 100 provides a means for attaching end components by conventional means such as welding and threading techniques and provides a means for reparability. Metallic jacket 100 shares the hoop stresses developed after contact between the inner tube and the outer jacket, which results in a factor of safety to burst for the hybrid cylinder. Once contact is made by inner sleeve to the outer jacket, the hoop stress is shared (relative to elasticity of components as mentioned above) resulting in the safety factor to burst pressure being greater than it would be for the individual components.

Use of metallic jacket 100 provides external damage resistance to the inner composite cylinder 10. Damage to the metal jacket 100 would not necessarily cause damage to the inner composite cylinder 10 and may not effect is functionality. Is also to replace the metal jacket 100 without the need to replace the inner composite cylinder 10 in the event that enough damage occurs to warrant replacement. Normal denting from usage will not effect the functioning of the inner composite cylinder 10. Composite cylinder is approximately seven times more elastic than the metallic jacket 100. The predetermined space/gap between the outer diameter of composite cylinder 10 and inner diameter of metallic jacket 100 is based on the amount the composite cylinder 10 will elastically expand at the design pressure. Since the composite cylinder 10 will not work harden under strain, like metals, it will not fail under continuous cycling. Since a clearance exists between the outer surface of the composite cylinder 10 and the inner surface of metallic jacket 100, composite cylinder 10 can be easily inserted into the metallic jacket 100 without the need for special boring, sizing, or finishing of the inner diameter of the metallic jacket 100.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A hybrid bearing cylinder comprising
   a composite sleeve having an annular side wall formed of a resin matrix composed of a resin material having fumed silica therein, the resin material at least partially at an inner surface of the side wall,
   a substantially continuous filament material embedded within the resin matrix, the substantially continuous filament material including a round cross-section,
   a metallic jacket positioned around the composite sleeve and having a inner surface that is positioned to lie near the annular side wall of the composite cylinder.

2. The hybrid bearing cylinder of claim 1, wherein the resin matrix further contains a plurality of particulate additives, said particulate additives being at least one of polytetrafluoroethylene, glass spheres and ground silica.

3. The hybrid bearing cylinder of claim 2, wherein the resin comprises about 2% to 8% by weight of fumed silica.

4. The hybrid bearing cylinder of claim 1, wherein the outer diameter of the composite sleeve is less the inner diameter of the metallic jacket to form a predetermined gap between the composite sleeve and the metallic jacket.

5. The hybrid bearing cylinder of claim 4, wherein the composite sleeve expands in diameter as a result of pressure within the composite sleeve.

6. The hybrid bearing cylinder of claim 5, further including a pair of end caps and coupler means for coupling the end caps to the metallic jacket.

7. A combination piston and hybrid bearing cylinder comprising
   a composite sleeve having a continuous inner bearing surface and an outer surface, the inner bearing surface defining a primary bearing direction along an axis of the cylinder, the composite sleeve formed from a resin matrix composed of a resin material having fumed silica therein, the resin material at least partially at the inner bearing surface, the fumed silica providing wear resistance to the continuous inner bearing surface, a substantially continuous filament material embedded within the resin matrix, the substantially continuous filament material including a round cross-section, the substantially continuous filament material forming a plurality of substantially rounded filament surfaces at said continuous inner bearing surface a piston having a surface for movement along the continuous inner bearing surface in the primary bearing direction, and a metallic jacket positioned around the composite sleeve and having a inner surface that is positioned to lie near the outer surface of the composite cylinder.

8. The combination piston and hybrid bearing cylinder of claim 7, wherein the resin matrix further contains a plurality of particulate additives, said particulate additives being at least one of polytetrafluoroethylene, glass spheres and ground silica.

9. The combination piston and hybrid bearing cylinder of claim 8, wherein the resin comprises about 2% to 8% by weight of fumed silica.

10. The hybrid bearing cylinder of claim 7, wherein the outer diameter of the composite sleeve is less the inner diameter of the metallic jacket to form a predetermined gap between the composite sleeve and the metallic jacket.

11. The hybrid bearing cylinder of claim 10, wherein the composite sleeve expands in diameter as a result of pressure within the composite sleeve.

12. The hybrid bearing cylinder of claim 11, further including a pair of end caps and coupler means for coupling the end caps to the metallic jacket.

13. A hybrid bearing cylinder comprising
a composite sleeve having a continuous inner bearing surface and an outer surface, the composite sleeve formed of a resin matrix composed of a resin material having fumed silica therein, the resin material at least partially at the inner bearing surface and a substantially continuous filament material embedded within the resin matrix, the inner bearing surface defining a primary bearing direction along an axis of the cylinder, a jacket positioned around the composite sleeve and having a inner surface that is positioned to lie near the outer surface of the composite cylinder, and wherein the outer diameter of the composite sleeve is less the inner diameter of the jacket to form a predetermined gap between the composite sleeve and the jacket.

14. The hybrid bearing cylinder of claim 13 wherein ends of the jacket extend further than the ends of the composite sleeve so that the jacket can be coupled with a metallic end cap.

15. The hybrid bearing cylinder of claim 14 wherein the ends of the jacket are threaded so that the jacket can be coupled to a metallic end cap having corresponding threads.

16. The hybrid bearing cylinder of claim 14 wherein the ends of the jacket can be welded to the metallic end cap.

17. The hybrid bearing cylinder of claim 13, wherein the composite sleeve expands in diameter as a result of pressure from within the composite sleeve.

18. The hybrid bearing cylinder of claim 17, wherein expansion of composite sleeve causes an outer surface of the composite sleeve to engage an inner surface of the jacket and wherein the composite sleeve and jacket cooperate to share the hoop stress caused by pressure from within the composite sleeve.

* * * * *